US011158220B2

(12) United States Patent
Garnier et al.

(10) Patent No.: US 11,158,220 B2
(45) Date of Patent: Oct. 26, 2021

(54) INTERACTIVE ANIMATED PROTECTION WINDOW WITH HAPTIC FEEDBACK SYSTEM

(71) Applicant: Universal City Studios LLC, Universal City, CA (US)

(72) Inventors: Timothy Fitzgerald Garnier, Windermere, FL (US); Akiva Meir Krauthamer, Orlando, FL (US); Matthew Usi, Orlando, FL (US); Simran V. Batra, Orlando, FL (US); David Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 58 days.

(21) Appl. No.: 16/215,438

(22) Filed: Dec. 10, 2018

(65) Prior Publication Data

US 2020/0184864 A1     Jun. 11, 2020

(51) Int. Cl.
*G09G 3/00* (2006.01)
*G06F 3/042* (2006.01)
*G06F 3/01* (2006.01)

(52) U.S. Cl.
CPC .............. *G09G 3/001* (2013.01); *G06F 3/016* (2013.01); *G06F 3/0421* (2013.01); *G09G 2354/00* (2013.01)

(58) Field of Classification Search
CPC ....... G06F 3/0421; G06F 3/016; G09G 3/001; G09G 2354/00; G03B 21/56
See application file for complete search history.

(56) References Cited

U.S. PATENT DOCUMENTS

| | | | |
|---|---|---|---|
| 6,212,805 B1 * | 4/2001 | Hill ........................ | B44F 1/066 40/442 |
| 6,635,306 B2 | 10/2003 | Steckl et al. | |
| 7,372,628 B2 | 5/2008 | Karlsen et al. | |
| 9,753,539 B2 * | 9/2017 | Hwang .................. | G06F 1/163 |
| 9,817,305 B2 | 11/2017 | Kim et al. | |
| 2007/0067106 A1 | 3/2007 | Antoine | |
| 2007/0069634 A1 | 3/2007 | Carmon et al. | |

(Continued)

FOREIGN PATENT DOCUMENTS

| | | |
|---|---|---|
| EP | 2685312 | 1/2014 |
| KR | 101440846 B1 | 9/2014 |

OTHER PUBLICATIONS

PCT/US2019/065216 Invitation to Pay Additional Fees Feb. 14, 2020.

(Continued)

*Primary Examiner* — Kwang-Su Yang
(74) *Attorney, Agent, or Firm* — Fletcher Yoder, P.C

(57) ABSTRACT

An animated window system may include a projection surface configured to display at least one image to a viewer on a viewer side of the projection surface, wherein the projection surface comprises a tinted material. The animated window system may also include a projector spaced apart from the projection surface, wherein the projector is configured to project the at least one image onto a rear side of the projection surface, the rear side opposing the viewer side and a controller comprising a memory and a processor, wherein the controller is configured to provide the at least one image to the projector to be projected onto the projection surface.

21 Claims, 6 Drawing Sheets

(56) References Cited

U.S. PATENT DOCUMENTS

| | | |
|---|---|---|
| 2007/0090751 A1 | 4/2007 | Cok et al. |
| 2010/0177050 A1* | 7/2010 | Heubel ................ G06F 3/0416 |
| | | 345/173 |
| 2013/0194554 A1 | 1/2013 | Aruga |
| 2013/0239057 A1* | 9/2013 | Ubillos ............... G06F 3/04842 |
| | | 715/833 |
| 2013/0329528 A1 | 12/2013 | Botten |
| 2015/0348304 A1 | 12/2015 | Kawash et al. |
| 2017/0034449 A1* | 2/2017 | Eum .................... H04N 5/2258 |
| 2017/0075114 A1* | 3/2017 | Quarta .................. H04N 9/315 |
| 2018/0315247 A1* | 11/2018 | Van Andel ......... G06K 9/00342 |
| 2019/0012988 A1* | 1/2019 | Miyahara ............... G09G 3/001 |
| 2019/0025692 A1* | 1/2019 | Yamashita ............. G03B 21/56 |

OTHER PUBLICATIONS

Paukert, "Watch How Ford's Feel the View Tech Helps the Blind See in Cars", Road Show, May 1, 2018, 2 pgs, https://www.cnet.com/roadshow/news/ford-feel-the-view-blind-visually-impaired-ai-tech-video/.

Meyer, "No Guardians, No Twilight Zone: Exploring Harrison Hightower's Tower of Terror," Walt Disney World News Today, Nov. 24, 2018, 21 pgs, https://wdwnt.com/2018/11/no-guardians-no-twilight-zone-exploring-harrison-hightowers-tower-of-terror/.

PCT Application No. PCT/US2019/065216, International Search Report and Written Opinion, dated Jun. 29, 2020, 18 pgs.

\* cited by examiner

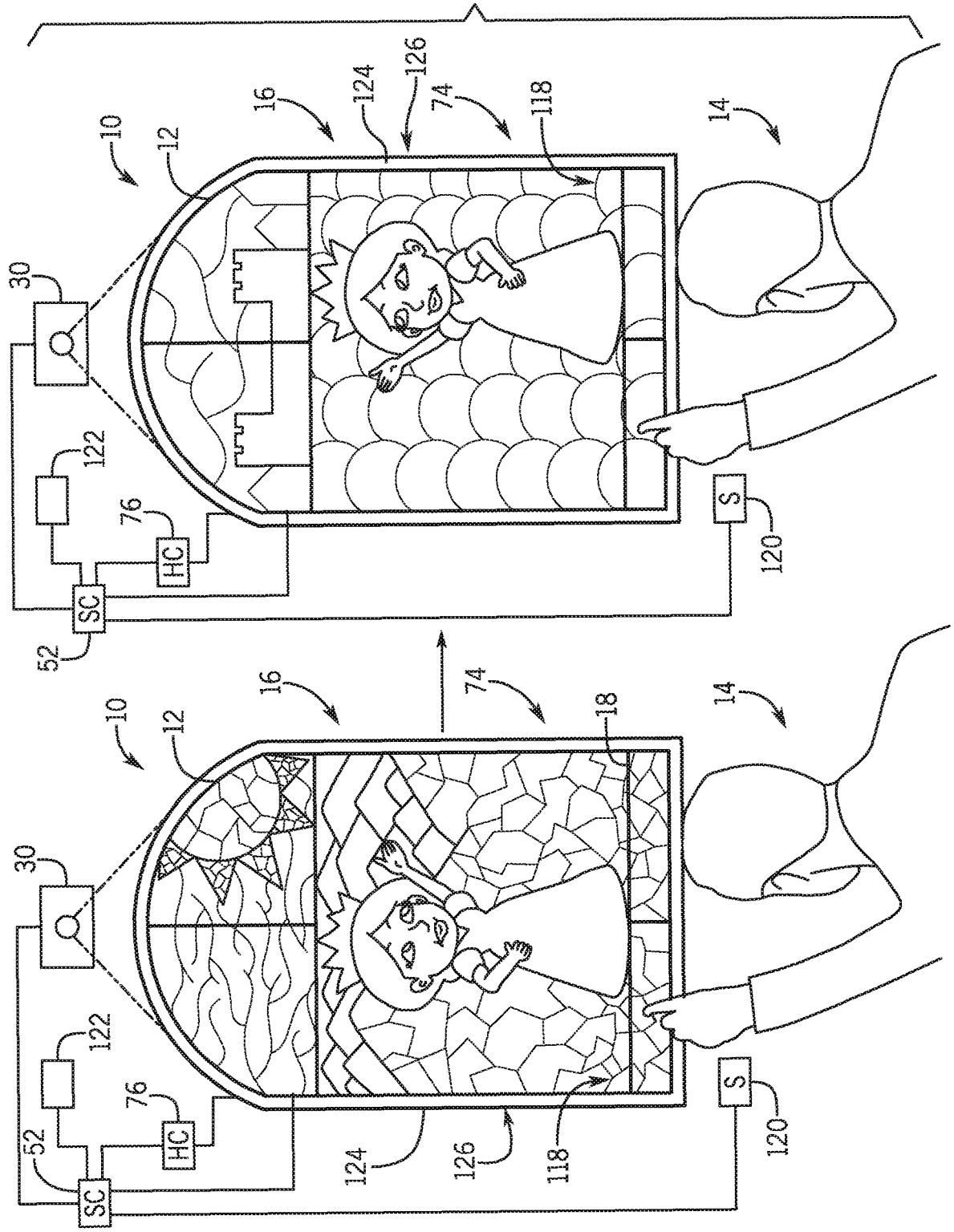

INTERACTIVE ANIMATED PROTECTION WINDOW WITH HAPTIC FEEDBACK SYSTEM

FIELD OF DISCLOSURE

The present disclosure relates generally to the field of amusement parks. More specifically, embodiments of the present disclosure relate to animated window systems.

BACKGROUND

Theme or amusement attractions have become increasingly popular. Such attractions may include images or projections intended to simulate a window displayed in a ride or other attraction. Window displays are generally created using static screens and/or front projection systems to provide a simulated image of the window or imagery beyond the window. Additionally, limitations of such screens or projection systems may not provide realistic or accurate window simulation, thus decreasing the immersive experience for patrons of the theme or amusement park attraction. Accordingly, it is recognized that there is a need for an improved window display system that provides an enhanced display to create a more immersive and interactive attraction experience.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an animated window system is provided. The animated window system includes a projection surface that displays at least one image to a viewer on a viewer side of the projection surface. The projection surface includes a tinted material. The system also includes a projector spaced apart from the projection surface and that projects the at least one image onto a rear side of the projection surface, whereby the rear side opposes the viewer side. A controller of the system includes a memory and a processor, and the controller provides the at least one image to the projector to be projected onto the projection surface.

In an embodiment an animated window system is provided. The animated window system includes a projection surface that displays an image to a viewer on a viewer side of the projection surface. The projection surface includes a tinted material. A projector of the system projects the image onto a rear side of the projection surface via rear projection. The system also includes a haptic feedback system that includes a plurality of haptic actuators associated with the projection surface. A controller of the system includes a memory and a processor, and the controller outputs signals to the projector to cause the image to be projected onto the projection surface. The controller provides instructions to the haptic feedback system indicative of an activation pattern of the plurality of haptic actuators based at least in part on the projected image.

In an embodiment, a method is provided. The method includes a step of projecting a first image onto a projection surface that includes a tinted material. The method includes the step of projecting a second image onto the projection surface subsequent to projecting the first image to cause an animation effect. The second image includes one or more unchanged regions that are present in the first image and one or more changed regions that are not present in the first image. The method includes the step of receiving a signal relating to a user interaction with the projection surface. The method includes the step of controlling activation of a special effects system based on the received signal to cause a special effects material to be emitted from an opening formed in the projection surface or from a conduit disposed on or in the projection surface. A location of the opening or the conduit corresponds to an unchanged region of the one or more unchanged regions of the projected second image.

DRAWINGS

These and other features, aspects, and advantages of the present disclosure will become better understood when the following detailed description is read with reference to the accompanying drawings in which like characters represent like parts throughout the drawings, wherein:

FIG. 6 illustrates a perspective view of the animated window projection system of FIG. 4, in accordance with an embodiment of the present disclosure.

DETAILED DESCRIPTION

Figure 1:
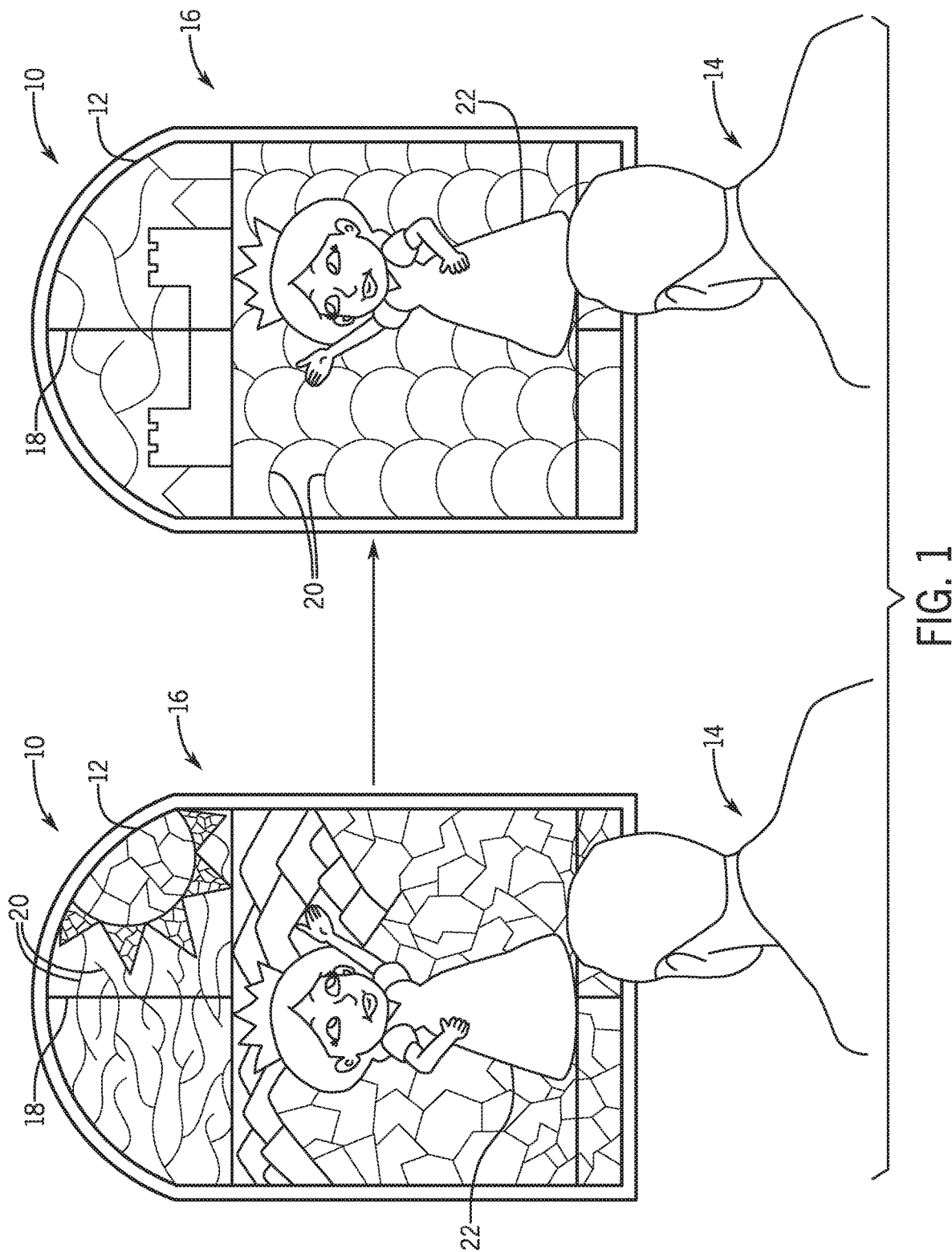
FIG. 1 illustrates a perspective view of an animation sequence of an animated window projection system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates to an animated window display or projection system for a theme park or an amusement park. Amusement parks include rides or attractions that provide an immersive experience for park guests. As part of the experience, such attractions may employ illusions or simulations to provide the experience of being at a different location and/or surrounded by a different environment. To aid in such illusions, guests may be presented with multiple reinforcing cues, such as with false windows that present an illusion of an exterior or other portion of the immersive environment.

The present techniques provide an animated window display or projection system for displaying an animated window, such as a stained glass window, that creates an immersive experience for patrons of an attraction. For example, the animated window projection system may include a semi-opaque and/or tinted projection surface that may improve a window simulation. The window simulation may use projected images to display both a simulated window image (e.g., stained glass, exterior view) as well as the physical structures that would be present in a window, such as sashes, frames, mullions, and/or metal cames. Further, the animated window projection system may provide animated imagery to the projection surface. The present techniques improve the immersive feeling of the window illusion by providing improved color brightness and contrast that is lacking in certain types of projection techniques. For example, projection technologies include a light source that projects images onto a projection surface. However, such techniques often achieve gray or muted dark colors rather than a realistic true black characteristic of mullions or metal cames. Further, projector light may wash out jewel tones characteristic of stained glass. Still further, the direct light of the projector is dissimilar to a more diffuse light that would be typical of light streaming through a window. By incorporating materials into a projection surface that enhance color or contrast and/or improve diffusion of the light, the projected image is more realistic and more closely resembles an actual exterior-facing window.

In some embodiments, the animated window facilitates interaction between the patrons and the attraction environment. Additionally, in some embodiments, the animated window projection system may include features that facilitate interaction between the patrons and the animated window projection system, such as an active surface that may provide haptic feedback, a special effects system, a touch interactive frame, and the like.

While the present techniques are discussed in the context of amusement or theme parks, it should be understood that the disclosed embodiments may also be applicable to other environments, such as entertainment venues or retail spaces.

With the foregoing in mind, FIG. 1 illustrates a perspective view of an animated window projection system 10 showing an animated projection sequence that may transition between a left image and a right image in accordance with disclosed embodiments. The animated window projection system 10 may be disposed within an attraction, such as a ride, a walk through attraction, a stationary attraction, or other attraction at a theme or amusement park. The animated window projection system 10 includes a projection surface 12 on which simulated window image(s) may be projected for viewing by a viewer 14 of an attraction. An image 16 or image sequence projected onto the projection surface 12 may be used to simulate an enhanced window display that may provide a more immersive experience, and in some embodiments, interactive experience, for the viewer 14.

The projection surface 12 of the animated window projection system 10 may replicate or simulate glass of a window. For example, in some embodiments, the projection surface 12 may replicate the glass surface of a stained glass window, including displayed features of the image 16 that represent metal mullions 18 or metal cames 20 that form part of the image 16 and that are rendered as the darkest portion of the image 16, e.g., in black. A projector of the animated window projection system 10 may project the image 16 or image sequence onto the projection surface 12 from behind the projection surface 12. Such projection techniques, as discussed in greater detail with reference to FIG. 2, may allow the image 16 displayed on the projection surface 12 to appear to the viewer 14 as light coming through the simulated window created by the animated window projection system 10. The projector of the animated window projection system 12 may provide animated images 16 that may, in some embodiments, appear as the glass of the window is animated, as shown between the right image and left image of FIG. 1. For example, as shown in the illustrated embodiment, the sequence of the images 16 may appear as an animated stained glass image 16 to the viewer 14. The projection surface 12 may be a semi or partially opaque, tinted surface, as discussed in greater detail with reference to FIG. 2. The material of the projection surface 12 may allow for increased contrast in colors of the projected image 16, such as deep black of the portions of the image 16 corresponding to mullions 18 or cames 20 and bright colors of the portions of the image 16 representing the glass, thus providing an enhanced display of a simulated window. For example, the material of the projection surface 12 may allow for more accurate simulation or replication of a stained glass window that includes bright colors as well as providing a more realistic simulation of black (e.g., metal, lead) section dividers shown as mullions 18 or cames 20. In the illustrated embodiment, the mullions 18 or other portions of the image representing the structure of the window may appear to be fixed in place as the display transitions between images 16, e.g., between the left and right image. In this manner, an illusion of animated or dancing glass may be enhanced as certain portions of the image 16 appear to change while other portions appear to be fixed in place, which in turn supports the illusion that the system 10 includes an actual physical window and its supporting structures and not merely a display. In the depicted images 16, certain images features, such as characters 22, may be presented as being unbound by the physical structure of the window and capable of moving even beyond or in front of fixed features such as the mullions 18 or cames 20. For example, the depicted character 22 may be depicted as moving throughout the window.

Additionally, in some embodiments, as discussed in greater detail below, the animated window projection system may include features, such as features that provide haptic feedback or allow the projection surface 12 to exhibit the tactile properties of the simulated window display. Further, in some embodiments, the animated window projection system 10 may include features that may provide additional special effects, such as fog, wind, water spray, sound, and lighting effects corresponding to the image 16 and/or animation of the image 16 that may further enhance the immersive experience of the viewer 14.

While the present techniques are discussed with specific reference to simulating a stained glass window display, other embodiments may involve other window display types. For example, the animated window projection system as provided herein may be used to create a window display designed to simulate a scene out of a clear glass window. Further, while the present techniques are discussed with specific reference to amusement parks, the disclosed embodiments may also be implemented in other contexts, such as retail, advertising, entertainment, and the like.

Figure 2:
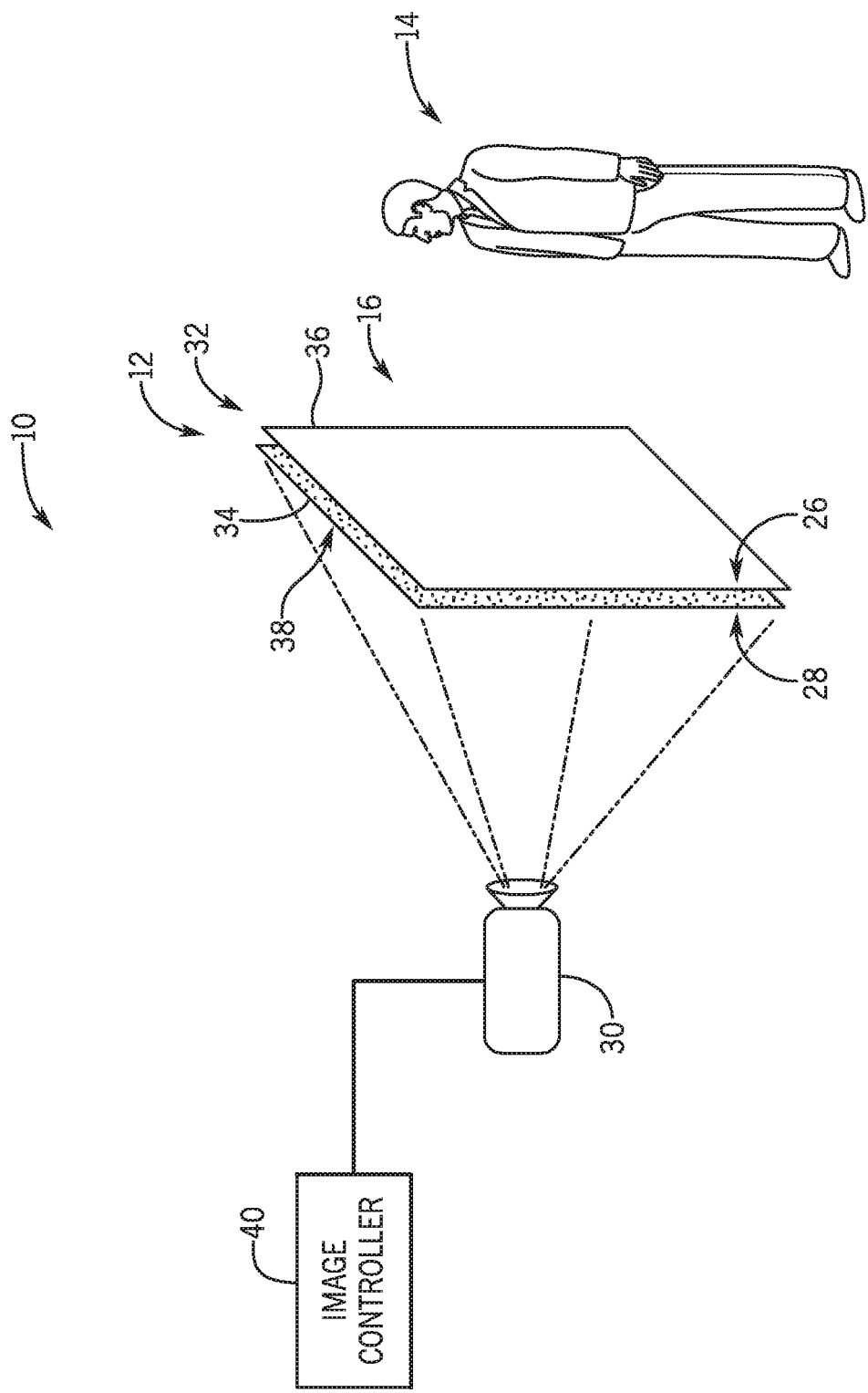
FIG. 2 illustrates a schematic view of an embodiment of the animated window projection system of FIG. 1, in accordance with an embodiment of the present disclosure.

To illustrate the projection surface 12 and the configuration of the animated window projection system 10, FIG. 2 is a schematic view of an embodiment of the animated window projection system 10 showing the configuration of the projection surface 12 with a viewer side 26 and an opposing rear side 28. A projector 30 is positioned closer to the rear side 28, and the viewer side 26 is positioned closer relative to the viewer 14. As previously discussed, the animated window projection system 10 may include the projection surface 12 and the projector 30 that may project the image 16 or 3119381 image sequence onto the projection surface 12. The image 16 or image sequence may be viewed on the projection surface 12 by the viewer 14.

The projection surface 12 may be a projection surface assembly 32 formed from one or more layers. The layers may include a projection layer 34 and a glass layer 36. The projection layer 34 may be disposed such that the image 16 or image sequence from the projector 30 is projected onto the projection layer 34. As such, in some embodiments, the projection layer 34 may be disposed nearest the projector 30, i.e., on the rear side 28, relative to the other layers of the projection surface 12. In some embodiments, the material of the projection layer 34 may be a semi-opaque and/or tinted material that is tinted with a color, such as a dark color (e.g., black, gray, dark blue, dark green), to reduce its light transmission. The darkness of the tint is a trade-off between the contrast that the final image will have (darker tint) and the raw brightness of the projector to achieve the same final image brightness. Colored tints (green, blue, etc.) may further be used to emulate imperfections formed in the stained glass or the type of metal used in the mullions.

The material of the projection layer 34 may be about 50%-80% opaque such that 20-50% of transmitted light passes through the projection layer 34. In the illustrated embodiment, light from the projector 30 passes through the projection surface assembly 32 in relation to the characteristics of its component layers, such as the projection layer 34. For example, if the material is tinted to permit 50% of light transmission, then 50% of the projector light passes from the rear side through to the viewer side of the projection surface 12. The semi-opaque quality of the projection layer 34 may allow for the projector 30 to be screened from the viewer 14 through the projection surface 12, thus increasing the immersive experience for the viewer 14. In one embodiment, the projection layer 34 is tinted with a tinted film or additional layer applied to the projection layer 34. In another embodiment, the projection layer 34 is dyed with, impregnated with, or includes pigment (e.g., metal oxides) distributed throughout the material to form the tint. Further, the materials of the component layers of the projection surface assembly 32 may be at least partially opaque or may reduce light transmission without any tinting. Accordingly, in one embodiment, the projection surface assembly 32 may, as a whole, reduce light transmission by 50-80%.

As discussed, the material of the projection layer 34 may be dark-tinted. In some embodiments, the tint of the projection layer 34 may be related to the semi-opaque quality of the projection layer 34. The tint of the projection layer 34 may allow for deep black, as well as bright colors, in the image 16 or image sequence projected onto the projection layer 34 by the projector 30. In some embodiments, the projection layer 34 may be tinted over an entire surface of the projection layer 34. In some embodiments, the projection layer 34 may only be tinted in areas of the projection surface 12 where the image 16 or image sequence is animated. For example, if the image 16 or image sequence projected onto the projection surface 12 contains animation in only some areas of the image 16, the projection layer 34 may only be tinted in that portion of the projection surface 12. For areas of the projection surface in which the image 16 remains static, in some embodiments, the projection layer 34 may not be tinted in those static areas. That is, the tint may only be present on the projection layer 34 where the image 16 or image sequence will present animation to the viewer 14.

In some embodiments, the projection layer 34 may be made of an acrylic or plastic material. Additionally, the projection layer 34 may be made from material with a matte quality that ranges from fully matte to fully glossy (e.g., little to no matte quality). For example, the projection layer 34 may be made from a cell-cast acrylic, such as P95, having a matte finish. A matte finish, similar to the semi-opaque quality of the material of the projection layer 34, may allow for the projector 30 to be screened or partially hidden from the viewer 14 through the projection surface 12 by diffusing the hotspot of the projector 30. As such, the projection layer 34 may be made from any material with light diffusing properties to increase the immersive experience of window display provided by the animated window projection system 10 by effectively diffusing the light hotspot of the projector so that it is not seen by the viewer 14. This may be a material, such as P95, that is effective at capturing light from a rear source (e.g., the projector 30) while diffusing the light in such a manner that the bulb of the projector 30 may not be identified by the viewer 14.

The projection surface 12 may also include the glass layer 36. The glass layer 36 may be a thin frost-textured glass layer that may provide the feel of the glass of a window if the viewer 14 touches the projection surface 12. As such, the glass layer 36 may be disposed nearest the viewer 14 and opposite the projector 30. The glass layer 36 may serve to closely recreate the visual and tactile properties of glass, such as stained glass, on the viewer side of the projection surface. Thus, the glass layer 36 may increase the accuracy of the replicated window display and enhance the immersive experience for the viewer 14 within the attraction.

Additionally, in some embodiments, the projections surface 12 may include an liquid crystal display (LCD) layer 38 that may be used to enhance the deep black color presented to the viewer 14, for example in embodiments in which the animated window projection system 10 is used to replicate a static or animated stained glass window having black dividers between colored glass panes. The LCD layer 38 may be a transparent LCD disposed closer to the rear side 28 than the viewer side 26, e.g., positioned between the projector 30 and the projection layer 34. The LCD layer 38 may be driven by a controller of the animated window projection system 10 to show or enhance additional black outline in the area of the displayed dividers (see mullions 18 or cames 20 of FIG. 1) in each frame of the image 16 or image sequence to enhance the quality of the displayed black color. As the outline or divider location may be known based on the image data used to project each image 16, as discussed in greater detail below, the LCD layer 38 can be driven to provide additional black in conjunction with the projected image 16 or image sequence.

As previously discussed, the projector 30 of the animated window projection system 10 may be disposed behind the projection surface 12, and on a rear side 28 opposite the viewer 14 or opposite the viewer side 26 of the projection surface 12, and may be used to project the image 16 or image sequence onto the projection surface 12 to replicate or simulate a window display, for example a static or animated stained glass window display. Such rear projection of the image 16 or image sequence onto the projection surface 12 may allow for the light beam produced by the projector 30 to be hidden from view of the viewer 14. Further, rear projection may allow for the animated window projection system 10 to simulate light coming in through the simulated window, thus more accurately simulating a window and enhancing the immersive experience for the viewer 14. Additionally, rear projection of the image 16 or image sequence (formed from displaying different images in sequence) onto the particular material of the projection layer of the projection surface 34, as discussed above, may allow for the display of deeper black than that which may be achieved by other projection techniques, such as front projection.

To more accurately display simulated light coming through the window, in some embodiments, the animated window projection system 10 may include multiple projectors 30 or one or more projectors 30 mounted on a mechanism that allows the projector 30 to be moved. The multiple projectors 30 and/or the mechanism on which the projectors 30 may be mounted may be communicatively coupled to the controller of the animated window projection system 10 such that the location of the light sources (e.g., a bulb or other light source of the projector 30) may be controlled in conjunction with the projected image 16 or image sequence. Thus, the angle of the light (e.g., projection) coming in through the projection surface 12 may be varied to simulate the change in the location of the light source at different times during a day, for example the change in the location of the sun at different times during the day. Additionally or alternatively, the light color of the projection may be varied to simulate a change in the light source at different times during the day.

In some embodiments, the image 16 or image sequence to be projected onto the projection surface 12 may be processed via an image controller 40 of the animated window projection system 10 and in communication with the projector 30. That is, the image 16 or image sequence may be rendered to look like glass, such as stained glass, or an image through glass to provide a more accurate simulated window display. As such, the image 16 or image sequence may not be a captured image of through glass or a captured image of stained glass, but rather may be rendered or processed to appear as glass when projected onto the projection surface 12 for viewing by the viewer 14, such that the image is manipulated or rendered rather than an unaltered photographic image. In some embodiments, the processing of the image 16 or image sequence may include addition of a reflection on a portion of the image 16 that may further simulate the look of a single light source, such as the sun, coming in through the simulated window. Additionally or alternatively, in some embodiments some color saturation may be added to the image 16 such that the colors presented on the projection surface 12 to the viewer 14 are bright in instances where some color saturation may be lost when the image 16 is projected through the material of the projection layer 34. These processing techniques may provide a more accurate and realistic simulated window via the animated window projection system 10 and provide a more immersive experience for the viewer 14. The processing of the image 16 or image sequence by the image controller 40 may not include simulating light coming through the window, as this is done via rear projection of the image 16 from the projector 30, as previously discussed. Further, the tint color of the projection surface 12 may contribute to improved color rendering.

Figure 3:
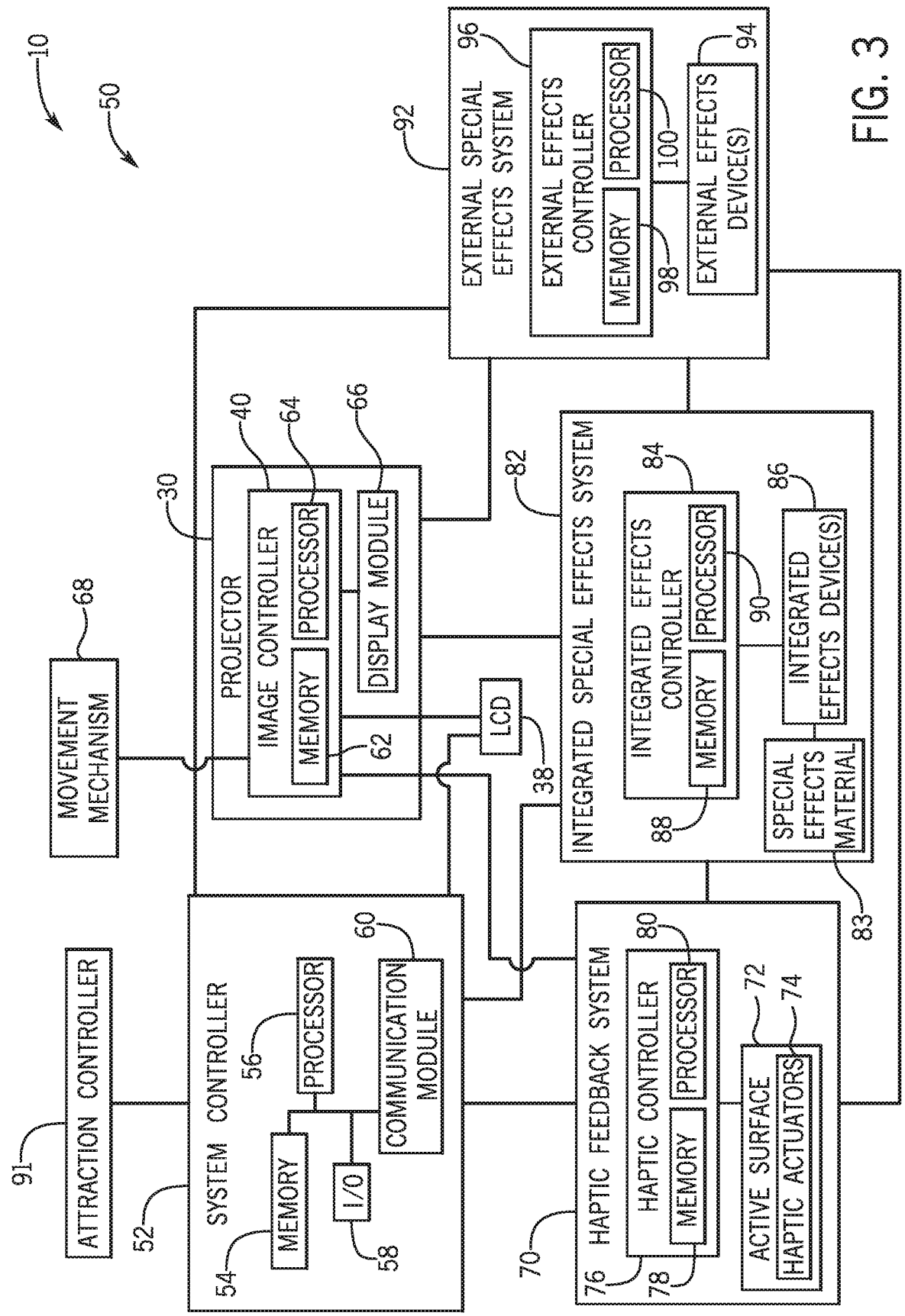
FIG. 3 illustrates a block diagram of a control system that may be employed within the animated window projection system of FIG. 2, in accordance with an embodiment of the present disclosure.

FIG. 3 illustrates an embodiment of a control system 50 that may be employed within the animated window projection system 10 to control image processing and projection of the image 16 or image sequence onto the projection surface, as well as, in some embodiments, coordinate and/or control additional effects that may be provided by the animated window projection system 10, as discussed in greater detail below. The control system 50 may include a system controller 52 that may be communicatively coupled to the other elements of the animated window projection system 10. The system controller 52 may control and/or coordinate the other elements of the animated window projection system 10. The system controller 52 may include a memory 54 and a processor 56. In some embodiments, the memory 54 may include one or more tangible, non-transitory, computer-readable media that store instructions executable by the processor 56 and/or data to be processed by the processor 56. For example, the memory 54 may include random access memory (RAM), read only memory (ROM), rewritable non-volatile memory such as flash memory, hard drives, optical discs, and/or the like. Additionally, the processor 56 may include one or more general purpose microprocessors, one or more application specific processors (ASICs), one or more field programmable logic arrays (FPGAs), or any combination thereof. Further, the memory 54 may store instructions executable by the processor 56 to perform the methods and control actions described herein for the animated window projection system 10.

The system controller 52 may further include one or more input/output (I/O) devices 58 that may facilitate communication between the system controller 52 and a user (e.g., operator). For example, the I/O devices may include a button, a keyboard, a mouse, a trackpad, and/or the like to enable user interaction with the system controller 52 and the control system 50. Additionally, the I/O devices 58 may include an electronic display to facilitate providing a visual representation of information, for example, via a graphical user interface (GUI), and application interface, text, a still image, and/or video content. Further, the system controller 52 may be configured to communicate with other elements of the animated window projection system 10 over wired or wireless communication paths. In some embodiments, the system controller 52 may include a communication module 60 that may facilitate transmission of information between the system controller 52 and the other elements of the control system 50 and the animated window projection system 10, such as the projector 30.

The projector 30 may be communicatively coupled to the system controller 52 and may project the image 16 or image sequence onto the projection surface 12 of the animated window projection system 10 such that it is presented to the viewer 14. Additionally, the projector 30 may be communicatively coupled to some or all of the other elements of the animated window projection system 10. The projector 30 may include the image controller 40, which may process the image 16 or image sequence using one or more techniques, as discussed above, to provide enhanced accuracy in the projected simulated window. The image controller 40 may include a memory 62 and a processor 64. In some embodiments, the memory 62 may include one or more tangible, non-transitory, computer-readable media that store instructions executable by the processor 64 and/or data to be processed by the processor 64. For example, the memory 62 may include random access memory (RAM), read only memory (ROM), rewritable non-volatile memory such as flash memory, hard drives, optical discs, and/or the like. Additionally, the processor 64 may include one or more general purpose microprocessors, one or more application specific processors (ASICs), one or more field programmable logic arrays (FPGAs), or any combination thereof. In some embodiments, the image controller 40 may be associated with the projector 30, as in the illustrated embodiment, or the image controller 40 may be disposed remotely from the projector 30. Alternatively, in some embodiments, some or all of the image processing techniques described as performed by the image controller 40 may be performed by the system controller 52.

The projector 30 may further include a display module 66. The display module 66 may be communicatively coupled to the image controller 40 and may generate the image 16 or image sequence and cause projection of the image 16 onto the projection surface 12 of the animated window projection system 10. In some embodiments, as previously discussed, the projector 30 may include or may be coupled to (e.g., mounted on) a movement mechanism 68. The movement mechanism 68 may be communicatively coupled to the image controller 40 and/or the system controller 52. The processor 64 of the image controller 40 and/or the processor 56 of the system controller 52 may be configured to determine a target location for the projector 30 and/or angle of the light (e.g., projection) to be projected through the projection surface 12 based on the target image 16 or image sequence. Based on the determined location of the projector 30 and/or the angle of the light to be projected, the processor 64 of the image controller 40 and/or the processor 56 of the system controller 52 may transmit signals indicative of the location, angle, or movement of the projector 30 to the movement mechanism 68. As such, the movement mechanism 68, in conjunction with the image controller 40 and/or the system controller 52, may vary the location (e.g., position) or angle of the projector 30 based on the target image 16 to be projected.

Additionally, in some embodiments, the image controller 40 may be communicatively coupled to the LCD layer 38 of the projection surface 12. As previously discussed, in some embodiments, the projection surface 12 may include the LCD layer 38 disposed between the projection layer 34 and the projector 30. The LCD layer 38 may be used to enhance the deep black color presented to the viewer 14, for example, in embodiments where the animated window projection system 10 is used to replicate a static or animated stained glass window having black dividers between colored glass panes. The LCD layer 38 may be driven by the image controller 40 and/or the system controller 52 to show additional black in areas of the image 16 or image sequence to enhance the quality of the displayed black color based on the image 16.

In some embodiments, the animated window projection system 10 may include a haptic feedback system 70 associated with or integrated into the projection surface 12. The haptic feedback system 70 may be used to provide haptic feedback to the viewer in instances where the viewer physically interacts with or touches the projection surface 12. As such, the haptic feedback system 70 may provide a tactile experience for the viewer 14, thus enhancing the immersive experience of the attraction. The haptic feedback system 70 may include an active surface 72 having a plurality of haptic actuators 74 (e.g., surface modifying components) that may be used to vary the surface of the projection surface 12 on the viewer side, such as during animation of the animated window projection system 10, as discussed in greater detail with reference to FIGS. 4 and 5.

The haptic feedback system 70 may be communicatively coupled to the system controller 52, as well as in some embodiments, other elements of the animated window projection system, such as the image controller 40. The haptic feedback system 70 may include a haptic controller 76 that may control actuation of the haptic actuators 74 to vary the surface of the projection surface 12. The haptic controller 76 may include a memory 78 and a processor 80. In some embodiments, the memory 78 may include one or more tangible, non-transitory, computer-readable media that store instructions executable by the processor 80 and/or data to be processed by the processor 80. For example, the memory 78 may include random access memory (RAM), read only memory (ROM), rewritable non-volatile memory such as flash memory, hard drives, optical discs, and/or the like. Additionally, the processor 80 may include one or more general purpose microprocessors, one or more application specific processors (ASICs), one or more field programmable logic arrays (FPGAs), or any combination thereof. In some embodiments, the haptic controller 76 may be associated with the active surface 72 and/or the projection surface 12, or the haptic controller 76 may be disposed remote from the active surface 72 and/or the projection surface 12. Alternatively, in some embodiments, some or all of the processes performed by the haptic controller 76 may be performed by the system controller 52.

In operation, in some embodiments, the haptic controller 70 may be configured to determine locations on the image 16 at which haptic feedback is to be provided based on the image 16 or image sequence and any animation of the image 16. For example, if the animated window projection system 10 is used to display an animated stained glass window, the haptic controller 70 may determine that haptic feedback is to be provided on individual displayed pieces of glass of the displayed stained-glass window, and/or along the simulated window pane dividers, such as along the displayed cames 20, such that the viewer 14 may feel movement along the displayed pieces of glass and the dividers as the image 16 moves between frames. The haptic controller 70 may determine the haptic feedback to provide based at least in part on the image 16 and may coordinate sending signals to the haptic actuators 74 to activate particular haptic actuators 74 with movement and/or processing of the image 16 that may be received from the image controller 40 and/or the system controller 52. Thus, the haptic controller 70 of the animated window projection system 10 may provide an enhanced immersive and interactive experience for the viewer 14.

Additionally or alternatively, in some embodiments, the animated window projection system 10 may include an integrated special effects system 82 that may be integrated into the projection surface 12 and may provide special effects that may be coordinated with the image 16 and/or animation of the image 16 or image sequence. For example, the integrated special effects system 82 may provide a special effects material 83, such as one or more streams of air, water, fog, or other fluid, that is emitted or ejected from the projection surface 12 such that it appears to the viewer 14 that the fluid has been sprayed from or through the simulated window. The integrated special effects system 82 may include an integrated effects controller 84 that may control activation of one or more integrated effects devices 86 to provide the special effects material 83, e.g., from a reservoir or source. The integrated effects controller 84 may include a memory 88 and a processor 90. In some embodiments, the memory 88 may include one or more tangible, non-transitory, computer-readable media that store instructions executable by the processor 90 and/or data to be processed by the processor 90. For example, the memory 88 may include random access memory (RAM), read only memory (ROM), rewritable non-volatile memory such as flash memory, hard drives, optical discs, and/or the like. Additionally, the processor 90 may include one or more general purpose microprocessors, one or more application specific processors (ASICs), one or more field programmable logic arrays (FPGAs), or any combination thereof. In some embodiments, the integrated effects controller 84 may be associated with the projection surface 12, or the integrated effects controller 84 may be disposed remote from the projection surface 12. Alternatively, in some embodiments, some or all of the processes performed by the integrated effects controller 84 may be performed by the system controller 52.

The integrated effects controller 84 may be communicatively coupled to the system controller 52, as well as in some embodiments, other elements of the animated window projection system 10. The integrated effects controller 84 may be communicatively coupled to the one or more integrated effects devices 86 and may be configured to send signals to the one or more integrated effects devices 86 to activate the one or more integrated effects devices 86 when it is determined that such special effects are to be provided in conjunction with the image 16. The integrated effects controller 84 and/or the system controller 52 may determine a trigger or initiation of the integrated special effects based at least in part on the image 16 or animation of the image 16 or image sequence. Additionally or alternatively, the integrated effects controller 84 and/or the system controller 52 may determine when the integrated special effects are to be provided based at least in part on haptic feedback provided by the haptic controller 76 (based on user interaction) and/or the general attraction environment that may be controlled by an attraction controller 91.

The integrated effects devices 86 may include pipes, conduits, or similar structures coupled to a fluid supply and/or a fan or other mechanism of moving the fluid to provide the special effects materials 83. For example, the integrated effects devices 86 may include one or more pipes coupled to a water source. The one or more pipes may run from the water source to the surface of the projection surface 12 on the viewer side. In some embodiments, the pipes may be disposed on or within the projection surface 12 such that it may appear to the viewer 14 that the water from the pipes is coming through the projection surface 12. For example, in some embodiments, the pipes may be disposed on or in the projection surface 12 along displayed black lines (e.g., mullions 18 or cames 20, see FIG. 1) or other regions of the image 16 that remain unchanged in a transition between two different images. That is, a first image 16 may transition to a second image 16. A comparison of the first and second images 16 may yield changed portions, reflecting the animation effect, and unchanged portions.

In some embodiments, if the pipes are disposed on the projection surface 12 in areas of the image 16 that are animated or that change as the images transition in the animation effect, the pipes may be coupled to a mechanism that may move the pipes to locations along the projection surface 12 such that the pipes are tracked to black lines or dark areas of the image 16. Such movement may use image data as an input to identify locations of black lines or dark areas of the image 16 and to move the pipes to such areas dynamically as the image 16 transitions. Static pipes along fixed or static black lines (e.g., black divider lines in animated stained glass embodiments) and/or pipes moved by a mechanism along the projection surface 12 to dynamically track to black lines may allow the pipes to be hidden from view of the viewer 14 and may provide an enhanced interactive and immersive experience for the viewer 14. Such pipes and mechanism of moving the pipes may be employed for other types of integrated effects devices 86 to provide air, fog, mist, or other similar fluid from the animated window projection system 10.

Additionally or alternatively, in some embodiments, the animated window projection system 10 may include an external special effects system 92 (e.g., not integrated within the projection surface 12) that may provide additional special effects coordinated with the image 16 or image sequence of the animated window projection system 10. For example, the integrated special effects system 82 may provide special effects such as sound, lighting, fog effects, or other similar special effects that may be provided by one or more external effects devices 94 (e.g., effects devices that are not integrated in the projection surface 12). The external special effects system 92 may include an external effects controller 96 that may control activation of one or more external effects devices 94. The external effects controller 96 may include a memory 98 and a processor 100. In some embodiments, the memory 98 may include one or more tangible, non-transitory, computer-readable media that store instructions executable by the processor 100 and/or data to be processed by the processor 100. For example, the memory 98 may include random access memory (RAM), read only memory (ROM), rewritable non-volatile memory such as flash memory, hard drives, optical discs, and/or the like. Additionally, the processor 100 may include one or more general purpose microprocessors, one or more application specific processors (ASICs), one or more field programmable logic arrays (FPGAs), or any combination thereof. In some embodiments, some or all of the processes performed by the external effects controller 96 may be performed by the system controller 52.

The external effects controller 96 may be communicatively coupled to the system controller 52, as well as in some embodiments, other elements of the animated window projection system 10. The external effects controller 96 may be communicatively coupled to the one or more external effects devices 94 and may be configured to send signals to the one or more external effects devices 94 to activate the one or more external effects devices 94 when it is determined that such external special effects are to be provided in coordination with the image 16. The external effects controller 96 and/or the system controller 52 may determine when the external special effects, such as sound, lighting, or fog, are to be provided based at least in part on the image 16 or animation of the image 16 or image sequence. Additionally or alternatively, the external effects controller 96 and/or the system controller 52 may determine when the external special effects are to be provided based at least in part on haptic feedback provided by the haptic controller 76 and/or the general attraction environment that may be controlled by the attraction controller 91.

In an embodiment, one or more portions of the projection surface 12 (see FIG. 2) may be fully clear (e.g., allowing 95-100% of transmitted light to pass through). The external special effects system 92 may be configured to emit particles (e.g., dust or reflective particles) into the air on the one or both sides of the projection surface to enhance the visibility of light from the projector 30 to create an illusion of light ray shafts from the sun. In one embodiment, the effect may be provided in conjunction with the moving projector/multi-projector angle system as mediated by the movement mechanism 68 of the projector 30. Having one or more clear sections of the projection surface 12 distributed within less transparent sections may also allow viewers to see a limited view through those clear sections. Providing some amount of visual scenery (screen, physical set, painting, etc.) on the rear side 28 that is visible through any clear sections enhances the illusion that a full world exists beyond the projection surface 12.

In another implementation, the movement mechanism 68 may further control independent light sources (e.g., not part of the projector) to control directionality of light. This directionally may be enhanced using particles in the air on one or both sides of the projection surface 12. One example might be a frame that could be added to the outside of a regular home window or a retail space that doesn't receive much real sunlight. The frame would shine light from a light source into the window at an angle controlled by a system that, for example, may be programmed to emulate the motion of the sun.

Figure 4:
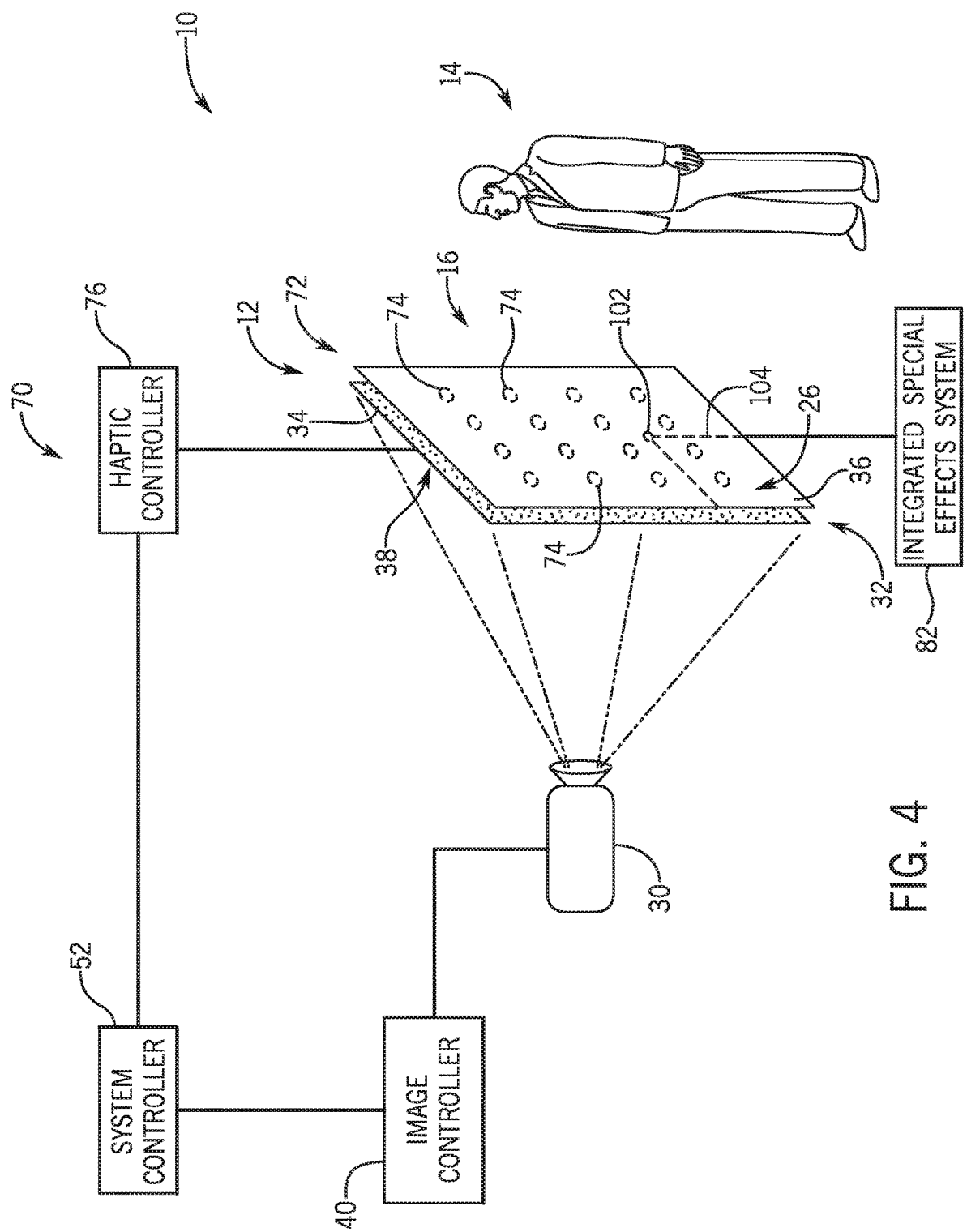
FIG. 4 illustrates a schematic view of an embodiment of an animated window projection system having an active surface to provide haptic feedback, in accordance with an embodiment of the present disclosure.

FIG. 4 illustrates a schematic view an embodiment of the animated window projection system 10 having the haptic feedback system 70 and the integrated special effects system 82 incorporated on or within the projection surface 12 to provide haptic feedback coordinated with animation of the image 16 or image sequence. It should be understood that the animated window projection system 10 may be implemented with one or both of the haptic feedback system 70 or the integrated special effects system 82 in certain embodiments. As previously discussed, the animated window projection system 10 may include the projection surface 12 and the projector 30 that may project the image 16 or image sequence onto the projection surface 12. The image 16 or image sequence may be viewed on the projection surface 12 by the viewer 14. Additionally, in some embodiments, the animated window projection system 10 may include the haptic feedback system 70 having a plurality of the haptic actuators 74 disposed about the active surface 72. In some embodiments, the active surface 72 may be an additional layer of the projection surface assembly 32. In some embodiments, the active surface 72 may be part of the projection layer 34 and/or the glass layer 36 or disposed within the projection layer 34 and/or the glass layer 36 of the projection surface 12 (e.g., the haptic actuators 74 disposed within the material of the projection layer 34 and/or the glass layer 36).

The haptic actuators 74 of the active surface 72 may modify the surface of the projection surface 12 in response to signals from the haptic controller 76 and/or the system controller 52. The haptic controller 76 and/or the system controller 52 in conjunction with the haptic actuators 74 may convert optical data associated with the location of particular portions of the image 16 received from the image controller 40 into tactile information to recreate the particular portions of the image 16 and/or animation of the image 16. For example, where the image 16 depicts an animated stained glass window, the haptic controller 76 may determine locations of the image 16 corresponding to dividers (e.g., mullions 18 or cames 20) that are dark in color and that remain fixed when the image 16 is animated (e.g., in an image sequence transitioning between images whereby only certain portions of the images change and other portions remain unchanged or static) based at least in part on image data from the image controller 40. The haptic controller 76 may then cause the haptic actuators 74 of the active surface 72 (i.e., of the projection surface 12) to actuate and modify the surface of the projection surface 12 such that the viewer 14 may feel the dividers if the viewer 14 were to touch the projection surface 12. The signals sent from the haptic controller 70 to control the actuation of the haptic actuators 74 may cause the haptic actuators 74 to vary in actuation as the image 16 is animated such that the modification of the projection surface 12 may follow the animation. That is, the actuation of the haptic actuators 74 may track the movement of the dividers during animation of the image 16 to allow the viewer 14 to feel the animation of the image 16.

The haptic actuators 74 may be any type of actuation mechanism that may allow for modification of the projection surface 12 toward the viewer side of the projection surface 12. For example, in some embodiments, the optical data of the image 16 may be converted into bumps on the projection surface 12 that form the shape of a structural feature of the image 16, such as the dividers (e.g., mullions 18 or cames 20, see FIG. 1) in embodiments where the image 16 is a simulated stained glass window. In some embodiments, a fluid may be used to displace or modify the surface of the projection surface 12 to provide tactile information. In some embodiments, the haptic actuators 74 may be vibration actuators and the optical data may be converted to acoustic waves or vibrations that create a pattern on the viewer surface of the projection surface 12. For example, intensity of the vibrations may vary. Based on the intensity of the vibrations, different shapes and/or contours on the surface of the projection surface 12 may be created that are representative of the particular portions of the image 16 and/or animation of the image 16.

In some embodiments, the haptic actuators 74 may include a plurality of pegs that move in response to one or more stimuli (e.g., a magnetic field, electric current) activated by the haptic controller 76 in a direction away from the projection surface 12 and toward the viewer 14. At least a portion of the pegs may protrude out from the projection surface 12, thereby forming bumps on the surface of the projection surface 12. In another embodiment, the haptic actuators 74 may include a plurality of pockets or cells that may be filled with a fluid (e.g., gas, liquid) in response to the one or more stimuli activated by the haptic controller 76. When filled, the pockets form bumps on the surface of the screen. In other embodiments, the pockets may include materials such as electrorheological (ER) or magnetorheological (MR) materials. ER and the MR materials respond to an electrical stimulus and a magnetic stimulus, respectively. In the absence of the respective stimulus, the ER and MR materials are in a liquid state. However, when the respective stimulus is applied, a viscosity of the ER and MR materials increases. The increase in the viscosity results in formation of a solid gel, thereby forming bumps or ridges on the surface of the projection surface 12. In certain embodiments, the haptic actuators 74 may include a combination of pegs and cells. Each peg and/or cell may be actuated independently and/or together to generate tactile information (e.g., bumps, ridges) that simulate protrusions from the projection surface 12 at particular portions of the image 16, such as along the black dividers between panes in a simulated window or stained glass window. As the image 16 is presented and/or animated, the haptic controller may vary which haptic actuators are activated such that the tactile information provided on the projection surface 12 changes as the image 16 is animated.

In some embodiments, the haptic actuators 74 may include magnetic particles (e.g., nanomagentic particles) that respond to a magnetic field. Each magnetic particle may be individually actuated by the magnetic field in response to the optical data received from the image controller 40 and/or system controller 52. The magnetic particles may modify the surface of the projection surface 12 to provide haptic feedback. For example, the magnetic particles may vibrate in response to the magnetic field. The vibrations may form a pattern on the projection surface 12 that is representative of the particular portions of the image 16. In some embodiments, the magnetic field may cause the magnetic particles to move. For example, the magnetic field may form a gradient on the projection surface 12. The magnetic particles may migrate to form patterns representing the particular portions of the image 16 on the projection surface 12 based on the magnetic field.

In some embodiments, the haptic actuators 74 may include polymers that respond to a stimuli (e.g., electrical current, temperature) from the haptic controller 76. For example, the haptic actuators 74 may include electroactive polymers (EAP), such as ferroelectric polymers that vibrate in response to an electric signal. Based on the intensity of the vibrations, the viewer 14 may feel different shapes on the projection surface 12 that correspond to the particular portions of the image 16. In some embodiments, the haptic actuators 74 may include light emitting diodes (LED) that vibrate at different frequencies and intensities. The LEDs may be actuated by the haptic controller 76 to correspond to the particular portions of the image 16. Other materials, such as piezoelectric materials and carbon nanotubes are also within the scope of the present disclosure.

Accordingly, the haptic actuators 74 of the haptic feedback system 70 may be any type of actuation mechanism that may vary or modify the viewer surface of the projection surface 12 such that particular portions of the image 16 may be felt by the viewer 14. For example, the haptic actuators 74 may be activated along the black dividers between panes of the projected window or stained glass window image to simulate such dividers as they may be felt on an actual window or stained glass window. As such, the haptic feedback system 70 of the animated window projection system 10 may provide a more accurate and realistic window display and may provide a more immersive experience for the viewer 14. In an animated window projection system 10 as provided, the system may simulate the effects of windows that are formed from different pieces of glass that may have different textures. To simulate this, the haptic actuators 74 and/or the instructions provided by the haptic feedback system 70 may be applied differently to the different displayed pieces of glass. For example, the haptic feedback system 70 may create different vibration intensity/patterns based on color of displayed piece of glass or based on texture of portion of image (rippled for water, rough for sand or a tree trunk). That is, the haptic feedback system 70 may be used to simulate the feeling created by touching glass that is smooth, rough, bubbled, warped, or has surface treatments that may be present in actual stained glass.

In certain embodiments, the projection surface 12 may include one or more passageways 102 in fluid communication with one or more pipes or conduits 104 that in turn are activated to provide a special effects material through the conduits 104 and passageways 102 to emit the special effects material out from the viewer side 26 and under control of the integrated special effects system 82.

Figure 5:
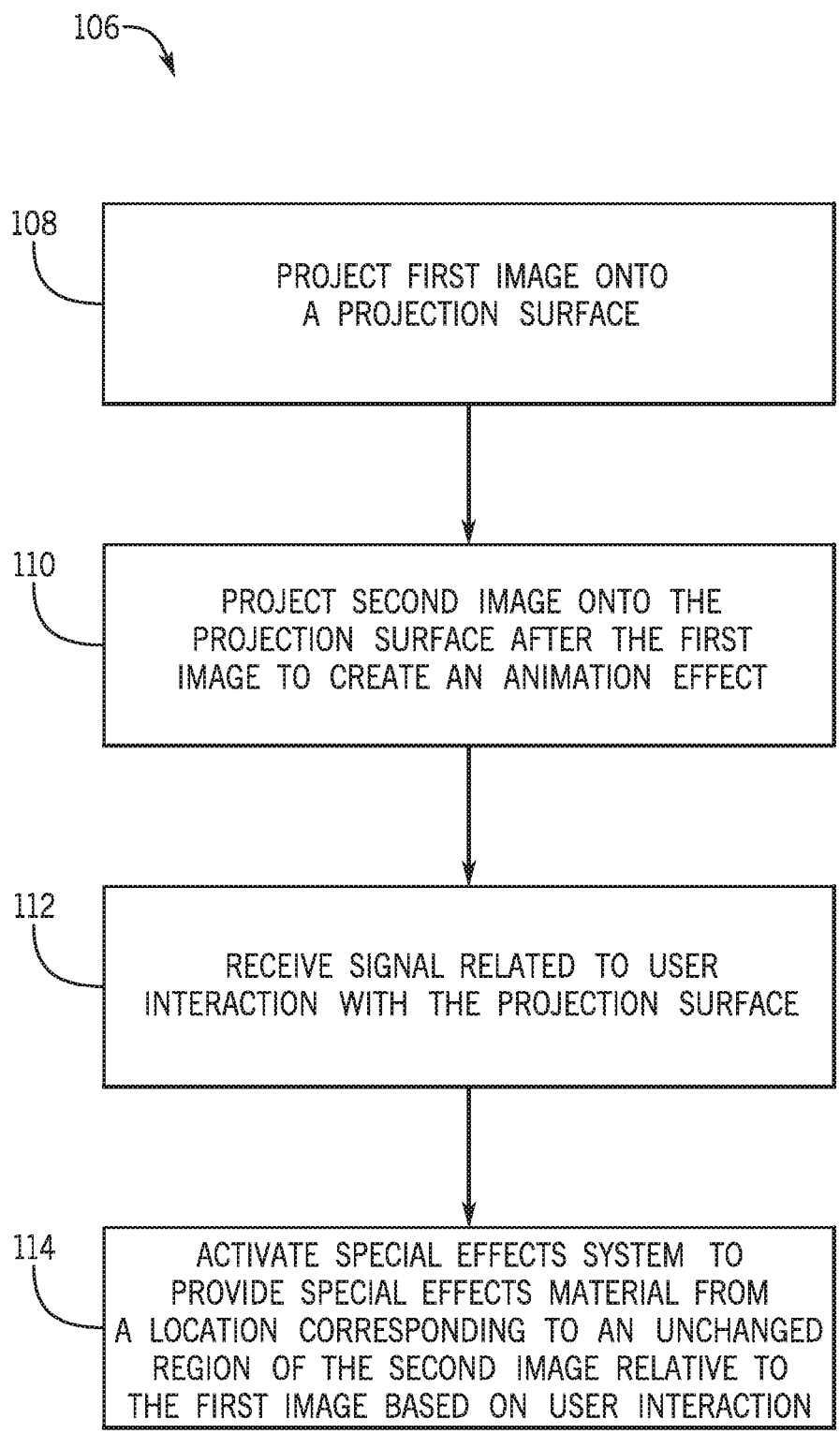
FIG. 5 illustrates a flow diagram of an animated window interaction technique in accordance with an embodiment of the present disclosure.

FIG. 5 is a flow diagram of a method 106 for controlling the special effects using the animated window projection system 10 that projects a first image onto a projection surface (block 108). The system 10 creates at least part of an animation effect by projecting a second image onto the projection surface subsequent to projecting the first image (block 110). The second image includes one or more unchanged regions that are present in the first image and one or more changed regions that are not present in the first image. Upon receiving a signal relating to a user interaction (e.g., sensor or proximity signal, haptic feedback) with the projection surface (block 112), the system controls activation of a special effects system (e.g., the integrated special effects system 82, see FIG. 3) based on the signal (block 114). Activation of the special effects system causes the special effects material to be emitted from an opening or passageway (e.g., passageway 102) formed in the projection surface or from a conduit (e.g., conduit 104) disposed on or in the projection surface 12. As discussed herein, the location of the opening 102 or the conduit 104 corresponds to an unchanged region as assessed by comparing the first image and the second image.

In one embodiment, the passageways 102, conduits 104, or other special effects disseminating structures are fixed in place, and the system 10 accounts for these features by rendering the displayed images 16 according to rules-based logic such that the images forming the image sequence are fixed in the locations corresponding to these features, while other locations are permitted to change to create an animation effect. In certain embodiments, the fixed portions of the image correspond to dark features, such as mullions.

FIG. 6 illustrates schematic view of an embodiment of the animated window projection system 10 showing the haptic feedback system 70 as well as other elements that may be present in the animated window projection system 10, such as sensing elements and a touch interactive technology. As previously discussed, the animated window projection system 10 may include the projection surface 12 and the projector 30 that may project the image 16 or image sequence onto the projection surface 12 via rear projection. The image 16 or image sequence may be viewed on the projection surface 12 by the viewer 14. Additionally, in some embodiments, the animated window projection system 10 may include the haptic feedback system 70 having the haptic actuators 74 disposed about the active surface 72 associated with the projection surface 12. In the illustrated embodiment, the viewer 14 is touching the viewer side of the projection surface 12. The haptic actuators 74 of the haptic feedback system 70 may provide haptic feedback that may allow the viewer 14 to feel portions of the simulated window image 16 projected onto the projections surface 12. For example, the haptic actuators 74 may cause bumps or ridges that protrude from the projection surface 12 toward the viewer 14 along features depicted as mullions 18 or cames or framework, such as dividers 118 in embodiments where the image 16 is a simulated stained glass image, as well as feeling a texture of the individual pieces of glass in the simulated stained glass image. As shown in the illustrated embodiment, as the image 16 changes the viewer 14 may feel the haptic feedback provided by the haptic actuators 74, thus creating a more realistic and immersive experience for the viewer 14. Additionally, as the image 16 is animated, such as from the left image to the right image, the activation of the haptic actuators 74 by the haptic controller 76 may track or follow the dividers 118 or other portions of the image 16 allowing the viewer 14 to feel the animation of the image 16 at times that the viewer 14 is touching the projection surface 12.

In some embodiments, the animated window projection system 10 may include a sensor 120 that may be used to detect or determine the presence of the viewer 14. The sensor 120 may be communicatively coupled to the system controller 52. In such embodiments, the image 16 may be animated by the image controller 40 and/or the system controller 52 based on signals received by the system controller 52 from the sensor 120 such that the image 16 may provide an animated image, for example an animated stained glass simulation, when the viewer 14 is detected. Additionally, or alternatively, in some embodiments, the animated window projection system 10 may include one or more cameras disposed adjacent to the projector 30, or any other location near the animated window projection system 10, and communicatively coupled to the system controller 52, that may provide image data of the area in front of the projection surface 12. The image data from the one or more cameras 122 may be used by the system controller 52, alone or in conjunction with the signals received from the sensor 120, to determine when the viewer 14 is in front of the projection surface 12. In some embodiments, the one or more cameras 122 may additionally or alternatively be used to determine when the viewer 14 is touching the projection surface 12, such that animation of the image 16 and/or activation of the haptic actuators 74 may be controlled based at least in part on interaction of the viewer 14 with image 16 and the projection surface 12.

Additionally or alternatively, to provide touch interaction for the viewer 14 of the image 16 and/or activation of the haptic actuators 74, in some embodiments, the animated window projection system 10 may include a touch interactive frame 124 disposed around or adjacent to the projection surface 12. The touch interactive frame 124 may be communicatively coupled to the system controller 52 and may include a plurality of sensors, such as infrared (IR) hairs 126, disposed on opposite sides of the touch interactive frame 124. The IR hairs 126 may be used to sense a location at which a finger or hand of the viewer 14 is touching the projection surface 12 based on which IR hairs 126 detect the finger or hand of the viewer 14. Such detection of touching of the projection surface 12 and location of the touching about the projection surface 12 may allow the system controller 52, the image controller 40, and/or the haptic controller 76 to control animation of the image 16 and/or activation of the haptic actuators 74 based at least in part on signals received from the touch interactive frame 124. That is, the touch interactive frame 124 may provide an opportunity for the viewer 14 to interact with and, in some embodiments, control the animation and/or haptic feedback presented on the projection surface 12 thus, providing a more immersive and interactive experience for the viewer 14.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An animated window system comprising:
a projection surface configured to display an image to a viewer on a viewer side of the projection surface, wherein the projection surface comprises a tinted material;
a projector configured to project the image onto a rear side of the projection surface via rear projection;
a haptic feedback system comprising a plurality of haptic actuators associated with the projection surface; and
a controller comprising a memory and a processor, wherein the controller is configured to output signals to the projector to cause the image to be projected onto the projection surface, wherein the controller is configured to provide instructions to the haptic feedback system indicative of an activation pattern of the plurality of haptic actuators based at least in part on the projected image, and wherein the instructions cause the activation pattern to activate haptic actuators at locations corresponding to window dividers in the projected image.

2. The animated window system of claim 1, wherein the controller is configured to cause the projector to transition from projecting the image to projecting one or more additional images to generate an animation effect, and wherein the controller is configured to update the instructions indicative of the activation pattern of the plurality of haptic actuators based at least in part on the projected one or more additional images.

3. The animated window system of claim 2, comprising a touch interactive frame disposed around the projection surface and communicatively coupled to the controller, wherein the touch interactive frame comprises a plurality of infrared (IR) sensors disposed on opposite sides of the touch interactive frame and configured to detect when and where the projection surface is touched on the viewer side, and wherein the controller is configured to control the animation effect, the activation pattern of the plurality of haptic actuators, or both based at least in part on signals received from the touch interactive frame indicative of when and where the projection surface is touched by the viewer.

4. The animated window system of claim 1, wherein the plurality of haptic actuators comprises a plurality of pegs or fluid-filled cells, and wherein each haptic actuator of the plurality of haptic actuators is individually addressable by the controller.

5. The animated window system of claim 1, wherein the activation pattern of the plurality of haptic actuators is configured to modify the projection surface on the viewer side to provide tactile information corresponding to at least a portion of the projected image.

6. The animated window system of claim 1, comprising a fluid supply and one or more conduits, wherein the one or more conduits are disposed along the projection surface and configured to provide a fluid to the viewer side of the projection surface, wherein the one or more conduits are disposed along portions of the projection surface where the projected image is static, the one or more conduits are coupled to a mechanism configured to move the one or more conduits to track along particular portions of the projected image where the projected image is animated, or both, and wherein the controller is configured to cause the fluid supply to supply fluid to the one or more conduits, cause movement of the one or more conduits, or both based at least in part on the projected image.

7. An animated window system comprising:
a projection surface configured to display at least one image on a viewer side of the projection surface, wherein the projection surface comprises a tinted material;
a projector spaced apart from the projection surface, wherein the projector is configured to project the at least one image onto a rear side of the projection surface, the rear side opposing the viewer side;
a sensor configured to detect an interaction of a user with a location on the viewer side of the projection surface; and
a controller comprising a memory and a processor, wherein the controller is configured to output signals to the projector to cause the at least one image to be projected onto the projection surface, and wherein the controller is configured to provide instructions to a haptic feedback system to activate one or more of a plurality of haptic actuators based at least in part on the location of the detected interaction on the viewer side of the projection surface, and wherein the instructions cause an activation pattern to activate haptic actuators at locations corresponding to window dividers in the projected image.

8. The animated window system of claim 7, wherein the instructions activate the one or more of the plurality of haptic actuators at the detected location.

9. The animated window system of claim 7, wherein the one or more of the plurality of haptic actuators are further activated based on a characteristic of the at least one image at the detected location.

10. The animated window system of claim 9, wherein the characteristic is a color of the at least one image at the location, and wherein a vibration intensity of the one or more of the plurality of haptic actuators is selected based on the color.

11. The animated window system of claim 9, wherein the characteristic is a displayed texture of the at least one image at the detected location.

12. The animated window system of claim 7, wherein the sensor is an infrared sensor.

13. A method, comprising:
projecting a first image onto a projection surface, wherein the projection surface comprises a tinted material;
projecting a second image onto the projection surface subsequent to projecting the first image to cause an animation effect, wherein the second image comprises one or more unchanged regions that are present in the first image and one or more changed regions that are not present in the first image;
receiving a signal relating to a user interaction with the projection surface; and
controlling activation of a special effects system based on the received signal, wherein activation of the special effects system causes a special effects material to be emitted from an opening formed in the projection surface or from a conduit disposed on or in the projection surface, and wherein a location of the opening or the conduit corresponds to an unchanged region of the one or more unchanged regions of the projected second image.

14. The method of claim 13, comprising activating one or more haptic actuators based on the received signal.

15. The method of claim 13, wherein the unchanged region corresponds to a dark or black portion of the projected first image and the projected second image.

16. The method of claim 13, wherein the tinted material comprises a tinted film.

17. The method of claim 13, wherein the tinted material comprises a dyed material.

18. The method of claim 13, wherein the special effects material comprises a fluid.

19. The method of claim 13, wherein the special effects material is emitted in a spray or mist from the opening or the conduit.

20. The method of claim 13, comprising:
projecting an image sequence onto the projection surface; and
activating a movement mechanism to move the conduit relative to the projection surface based on image data of the image sequence.

21. The method of claim 20, wherein a portion of the image data is indicative of movement of black lines in the image sequence.

* * * * *

UNITED STATES PATENT AND TRADEMARK OFFICE
CERTIFICATE OF CORRECTION

PATENT NO. : 11,158,220 B2  
APPLICATION NO. : 16/215438  
DATED : October 26, 2021  
INVENTOR(S) : Timothy Fitzgerald Garnier et al.

Page 1 of 1

It is certified that error appears in the above-identified patent and that said Letters Patent is hereby corrected as shown below:

On the Title Page

Item (54) and in the Specification, Column 1, Lines 1-3 should be changed from "INTERACTIVE ANIMATED PROTECTION WINDOW WITH HAPTIC FEEDBACK SYSTEM" to "INTERACTIVE ANIMATED PROJECTION WINDOW WITH HAPTIC FEEDBACK SYSTEM"

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*